United States Patent [19]
Yokokawa et al.

[11] Patent Number: 6,122,427
[45] Date of Patent: Sep. 19, 2000

[54] SPACER TYPE OPTICAL FIBER CABLE

[75] Inventors: Tomoyuki Yokokawa; Yoshiyuki Suetsugu, both of Yokohama; Kazuo Hogari, Tokyo; Shin-ichi Furukawa, Mito, all of Japan

[73] Assignees: Sumitomo Electric Industries, Ltd., Osaka; Nippon Telegraph and Telephone Corporation, Tokyo, both of Japan

[21] Appl. No.: 09/082,466

[22] Filed: May 21, 1998

[30]   Foreign Application Priority Data

May 21, 1997 [JP] Japan ...................................... 9-131261

[51] Int. Cl.⁷ ...................................................... G02B 6/44
[52] U.S. Cl. ............................ 385/110; 385/113; 385/111
[58] Field of Search ..................................... 385/109, 110, 385/111, 112, 113, 114, 101

[56]   References Cited

U.S. PATENT DOCUMENTS 5,561,730  10/1996  Lochkovic et al. ..................... 385/114
5,825,957  10/1998  Song ....................................... 385/113

FOREIGN PATENT DOCUMENTS 59-181403  12/1984  Japan .
62-258411  11/1987  Japan .

*Primary Examiner*—Hung N. Ngo
*Attorney, Agent, or Firm*—Pillsbury Madison & Sutro LLP

[57]   ABSTRACT

A spacer having a high-tensile member at the center thereof has grooves extending helically. Coated optical fibers have been disposed in each groove. This assembly is covered with a wound covering and further with a sheath. The proportion of the total sectional area of the coated optical fibers to the sectional area of each groove, i.e., the degree of packing, is regulated to 10 to 50%.

9 Claims, 4 Drawing Sheets

FIG.5

| PITCH | ONE YARN | TWO YARNS IN OPPOSITE DIRECTION |
|---|---|---|
| 100 mm | ○ | ○ |
| 200 mm | ○ | ○ |
| 300 mm | △ | ○ |
| 400 mm | × | ○ |
| 500 mm | × | △ |
| 600 mm | × | × |

SPACER TYPE OPTICAL FIBER CABLE

BACKGROUND OF THE INVENTION

1. Field of the Invention

The present invention relates to a spacer type optical fiber cable containing coated optical fibers which is necessary for the construction of an optical communication network. More particularly, the present invention relates to a spacer type optical fiber cable suitable for in-building installation where vertical installation is also required.

2. Description of the Related Art

Optical fiber cables have been developed which comprise coated optical fibers fitted to a grooved spacer in a high density. For example, a spacer type optical fiber cable is known which comprises coated optical fibers bundled with a yarn, string, or the like and fitted to a grooved spacer, as shown in JP-A-U-59-181403 and JP-A-62-258411. (The terms "JP-A-U" and "JP-A" as used herein mean an "unexamined Japanese utility model publication" and an "unexamined Japanese patent publication", respectively.)

The conventional spacer type optical fiber cables of the above kind have the following problems because the degree of packing of coated optical fibers in the grooves of the spacer has not especially been taken in account. The "degree of packing" herein is calculated for each groove and defined by the following equation.

Degree of packing (%)=[(total sectional area of the coated optical fibers)/(sectional area of that space in the groove where an coated optical fiber can move)]×100

It is a matter of course that the sectional area of that space in a groove where an coated optical fiber can move includes the sectional area occupied by the coated optical fibers. Consequently, when coated optical fibers alone have been disposed in a groove having a sectional area of S and the total sectional area of the coated optical fibers is F, then the degree of packing is (F/S)×100.

In the case where an optical fiber cable containing coated optical fibers disposed in grooves is subject to low-temperatures, e.g., in winter, the coated optical fibers become longer relative to the cable due to a difference in the coefficient of linear expansion between the material constituting the cable and the coated optical fibers, and hence tend to meander within the grooves. Namely, a phenomenon occurs in which the coated optical fibers come to have an excess of length. In general, this kind of optical fiber cable is manufactured so that the coated optical fibers have a length in excess of the minimum necessary length in some degree. However, if the coated optical fibers in an optical fiber cable having too high a degree of coated optical fiber packing come to additionally have such an excess of length, the coated optical fibers come to have a reduced pitch of meandering in each groove because of the small space and, hence, the radius of curvature of the bends of the coated optical fibers is reduced. Since the meandering pitch is not always constant, the parts in which the excess of length is concentrated have an exceedingly reduced radius of curvature and this results in an increased bending loss and sometimes leads to breakage of the coated optical fibers.

On the other hand, this kind of optical fiber cable is often used for in-building vertical installation. In this application, if the degree of packing of the coated optical fibers is too low, then the coated optical fibers with some excess length readily shifts downward to generate an area where the execss length is concentrated, and this also results in an increased bending loss and sometimes laeds to breakage of the coated optical fibers.

In JP-A-U-59-181403 cited above, there is no disclosure of these problems, and no means for solving the same is given. In JP-A-62-258411 discloses a technique in which coated optical fibers are fitted into helical grooves while applying tensile stress thereto. However, the cable containing coated optical fibers disposed under tensile stress has a problem that the tension imposed on the coated optical fibers increases when the cable is bent or as the temperature of the atmosphere changes.

Furthermore, air-core type cables in which the grooves are not filled with a jelly have a problem that yarns coarsely wound around the coated optical fibers get loose especially at an end part, although cables in which the grooves are filled with a jelly are free from the problem of the yarns readily getting loose.

SUMMARY OF THE INVENTION

It is an object of the present invention to provide an air-core spacer type optical fiber cable in which an excess of length generating in the coated optical fibers can be absorbed and the excess of the length of the coated optical fibers can be inhibited from shifting in the lengthwise direction.

BRIEF DESCRIPTION OF THE DRAWINGS

In the accompanying drawings:

FIG. 5 is a presentation showing the results of a test for examining influences of conditions for the coarse winding of cotton yarns on the effect of preventing loosening.

DETAILED DESCRIPTION OF THE INVENTION

Figure 1:
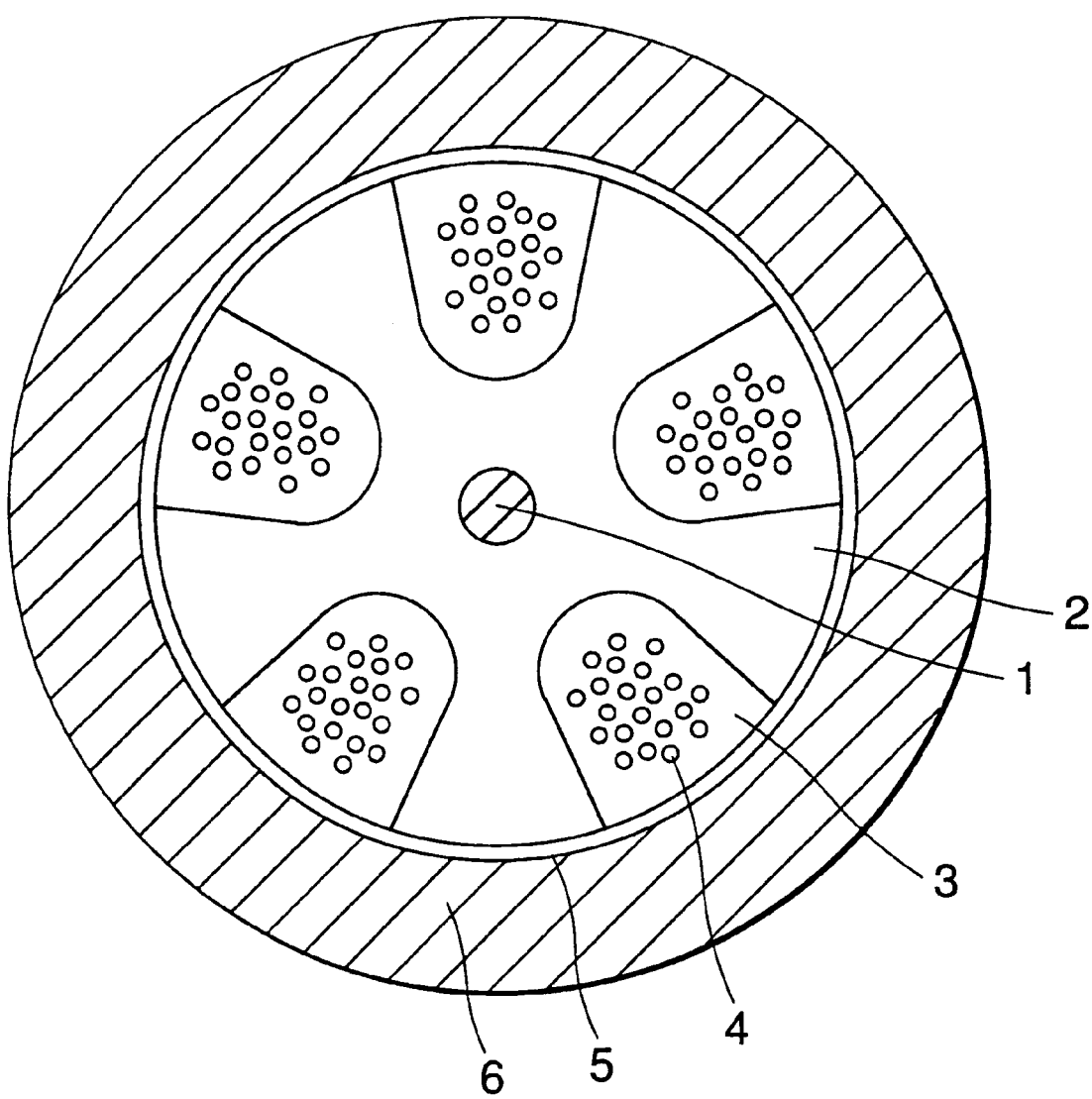
FIG. 1 is a sectional view of the first embodiment of the spacer type optical fiber cable according to the present invention.

Detailed description of the present invention will be described as follows.

In the first aspect of the present invention, an air-core spacer type optical fiber cable comprises a spacer having continuous grooves extending in the lengthwise direction and coated optical fibers disposed in the grooves without using a filler for filling the grooves, and in which in each of the grooves containing the coated optical fibers, the proportion of the total sectional area of the coated optical fibers to the sectional area of the space where a coated optical fiber can move is from 10 to 50%.

In the second aspect of the present invention, in the spacer type optical fiber cable according to the first aspect of the present invention, the coated optical fibers disposed in each groove consist of coated optical fiber units each consisting of a plurality of coated optical fibers around which one or more yarns or strings have been coarsely wound.

In the third aspect of the present invention, in the spacer type optical fiber cable according to the second aspect, a plurality of yarns or strings have been coarsely wound around the coated optical fibers of each unit, at least a pair of the yearns or strings being wound in opposite directions.

In the fourth aspect of the present invention, in the spacer type optical fiber cable according to the second or third aspect, the pitch of coarse winding of the yarns or strings is from 10 mm to 400 mm. If the pitch is less than 10 mm, the coated optical fibers in one bundle are hard to move with respect to each other. Accordingly, when the cable is bent, the stress remains in the coated optical fibers thereby increasing transmission loss. If the pitch is more than 400 mm, the bundle is easy to come loose.

In the fifth aspect of the present invention, in the spacer type optical fiber cable according to any one of the second to fourth aspect, the yarns or strings have been colored.

In the sixth aspect of the present invention, in the spacer type optical fiber cable according to any one of the second to fifth aspect, each coated optical fiber unit consists of a plurality of coated optical fibers which each has an outer diameter from 230 to 290 $\mu$m and around which one or more yarns having a fineness of from 100 to 300 deniers have been coarsely wound.

In the seventh aspect of the present invention, in the spacer type optical fiber cable according to any one of the second to fifth aspect, each coated optical fiber unit consists of a plurality of coated optical fibers which each has an outer diameter from 450 to 550 $\mu$m and around which one or more yarns having a fineness of from 400 to 700 deniers have been coarsely wound.

In the sixth and seventh aspect, if the yarns are too thick in comparison with the coated optical fiber, the coated optical fibers are hard to move with respect to each other in one bundle. On the other hand, if the value of deniers are too small, because the force applied to each fibers in the yarns is made large, the side pressure may be locally applied to the coated optical fiber to thereby increase the transmission loss.

In the eighth aspect of the present invention, in the spacer type optical fiber cable according to any one of the second to seventh aspect, the yarns or strings are made of cotton, a nylon, or a carbon fiber or of a combination of two or more thereof.

In the ninth aspect of the present invention, in the spacer type optical fiber cable according to any one of the first to eighth aspect, the grooves of the spacer extend in the form of S-Z twist.

Preferred embodiments according to the present invention will be described as follows referring to the accompanying drawings.

FIG. 1 is a sectional view of the first embodiment of the spacer type optical fiber cable according to the present invention. In the drawing, a reference numeral 1 denotes a high-tensile member; 2, a spacer; 3, a groove; 4, a coated optical fiber; 5, a wound covering; and 6, a sheath. The high-tensile member 1 may be a steel wire, a stranded steel wire, a carbon fiber, etc. However, in the case where the optical fiber cable is used as a unit cable, the high-tensile member 1 is not always necessary. In this embodiment, a steel wire is used. The spacer 2 is formed by extruding a synthetic resin, e.g., polyethylene, so that the extrudate has grooves 3. The grooves 3 formed are either helical grooves extending in parallel with each other or reversing helical grooves (S-Z twist form). The grooves 3 each contains coated optical fibers 4, provided that part of the grooves 3 need not contain coated optical fibers. After coated optical fibers have been disposed in the grooves 3, the wound covering 5 is formed by winding a tape or string therearound. The resultant assembly is covered with the sheath 6.

In each groove 3 in which coated optical fibers are disposed, the degree of packing has been regulated to 10 to 50%. If the degree of packing is lower than 10%, the coated optical fibers 4 readily move in the grooves 3 and vertical in-building installation or the like is apt to generate an area where an excess of length is concentrated. On the other hand, if the degree of packing exceeds 50%, the coated optical fibers are apt to have bends having a reduced radius of curvature if the coated optical fibers come to additionally have an excess of length. In the present invention, such problems can be eliminated by regulating the degree of packing to a value in the range of from 10 to 50%.

Experimental data for an example of the first embodiment are explained. Each of the coated optical fibers 4 used is a single-fiber coated optical fiber having a coating 250 $\mu$m thick in diameter. Twenty such coated optical fibers 4 are disposed in each groove 3. The spacer 3 has five grooves, which each contain the same number of coated optical fibers 4. Hence, this spacer type optical fiber cable contains a hundred fibers in total. The high-tensile member 1 is a steel wire having a diameter of 1.4 mm. The spacer 3 has an outer diameter of 10.5 mm, and the optical fiber cable including the sheath 6 has an outer diameter of 15.0 mm. The grooves 3 extend in the form of S-Z twist, and the reversing pitch and the reversing angle are 250 mm and 275°, respectively. The grooves 3 each has a sectional area of 7.3 mm$^2$ and the total sectional area of twenty coated optical fibers is 1.0 mm$^2$. Consequently, the degree of packing of each groove with coated optical fibers is $(1.0/7.3) \times 100 \approx 14\%$.

Figure 2:
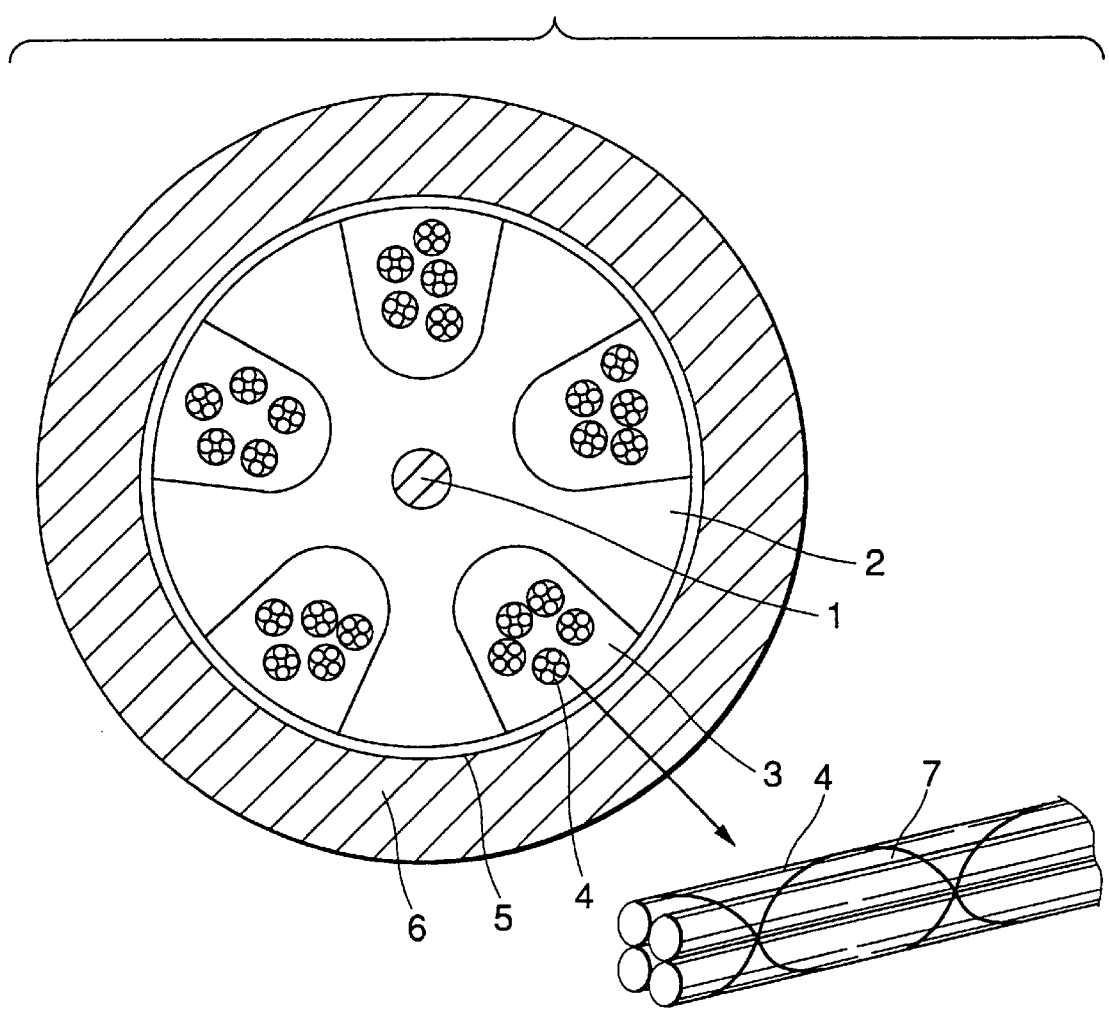
FIG. 2 is a sectional view of the second embodiment of the spacer type optical fiber cable according to the present invention.

FIG. 2 is a sectional view of the second embodiment of the spacer type optical fiber cable according to the present invention. In this drawing and FIG. 1, the same portions or parts are designated by the same numerals; explanations thereon are omitted here. Numeral 7 denotes a yarn. This embodiment differs from the first embodiment in that the coated optical fibers 4 disposed in each groove 3 consist of coated optical fiber units each consisting of coated optical fibers around which yarns 7 have been coarsely wound. The member which is coarsely wound is not limited to yarns, and strings may also be used.

Use of such bundles each comprising coated optical fibers 4 is advantageous in not only that the coated optical fibers 4 can be easily handled, but also that the frictional resistance between the inner wall of each groove 3 and the coated optical fibers 4 is enhanced to thereby heighten the effect of inhibiting the coated optical fibers 4 from shifting within the groove 3 in the lengthwise direction. Although the clearance in each groove in this embodiment is reduced due to the yarns or strings, the stress imposed on the coated optical fibers can be minimized by selecting a soft material such as cotton, a nylon, a carbon fiber, e.g., Kevlar (registered trademark), or the like as the material of the yarns or strings, as will be described later.

Furthermore, by coloring the yarns or strings, coated optical fibers of the same color can be distinguished from each other, so that a larger number of coated optical fibers can be disposed in each groove. In this embodiment, when a plurality of yarns or strings are used for coarse winding and at least two of these are wound in opposite directions, then fibers of the yarns or strings are entwined with each other at the intersections to thereby produce an effect of inhibiting the yarns or strings from getting loose.

For example, the colors of the yarns or strings are blue, yellow, green, red, purple, white, brown, slate, orange, pink, aqua and black. The number of combination of selecting two colors from the twelve colors is 66. For example, the respective five bundles put in one groove are bundled by different two color-combination yarns, i.e., blue-white, yellow-white, green-white, red-white and purple-white yarns.

Experimental data for an example of this embodiment are the same as those given hereinabove with regard to the first embodiment. Each coated optical fiber unit consists of four coated optical fibers bundled by coarse winding. The yarns 7 in each bundle are two cotton yarns having a fineness of 225 deniers and wound in opposite directions. The pitch of coarse winding is from 60 to 80 mm.

The examples of the first and second embodiments described above were examined for initial transmission loss. The maximum transmission loss for the hundred coated optical fibers was 0.213 dB/km at a wavelength $\lambda$ of 1.55 $\mu$m. All other properties, including mechanical properties and temperature characteristics, were satisfactory.

Figure 3:
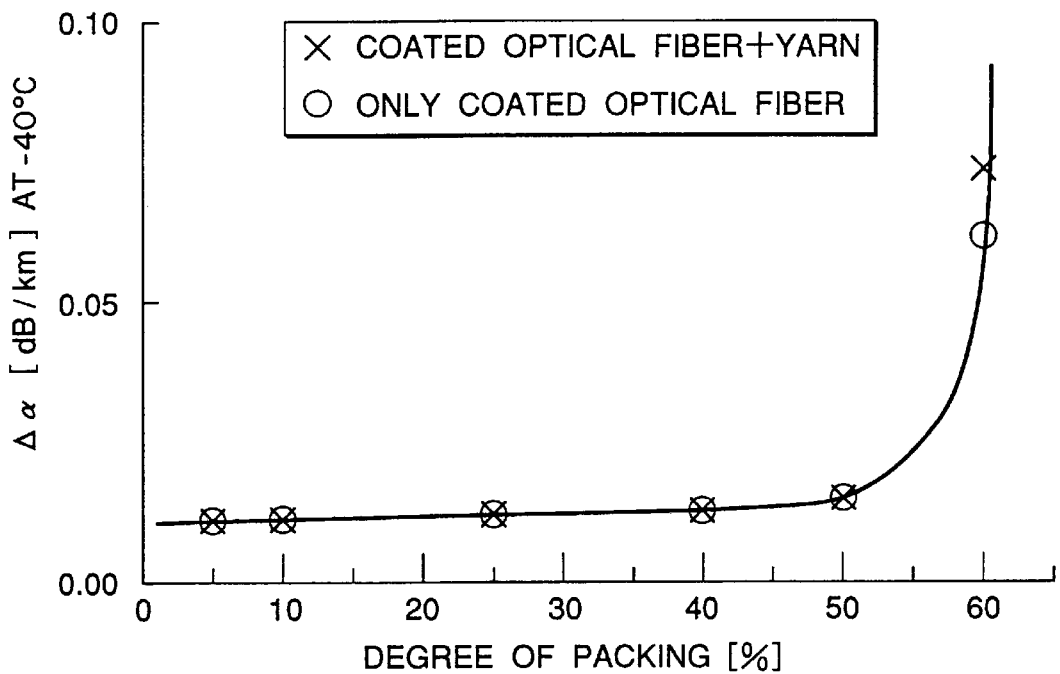
FIG. 3 is a presentation showing the results of a heat cycle test conducted on cable samples.
Figure 4:
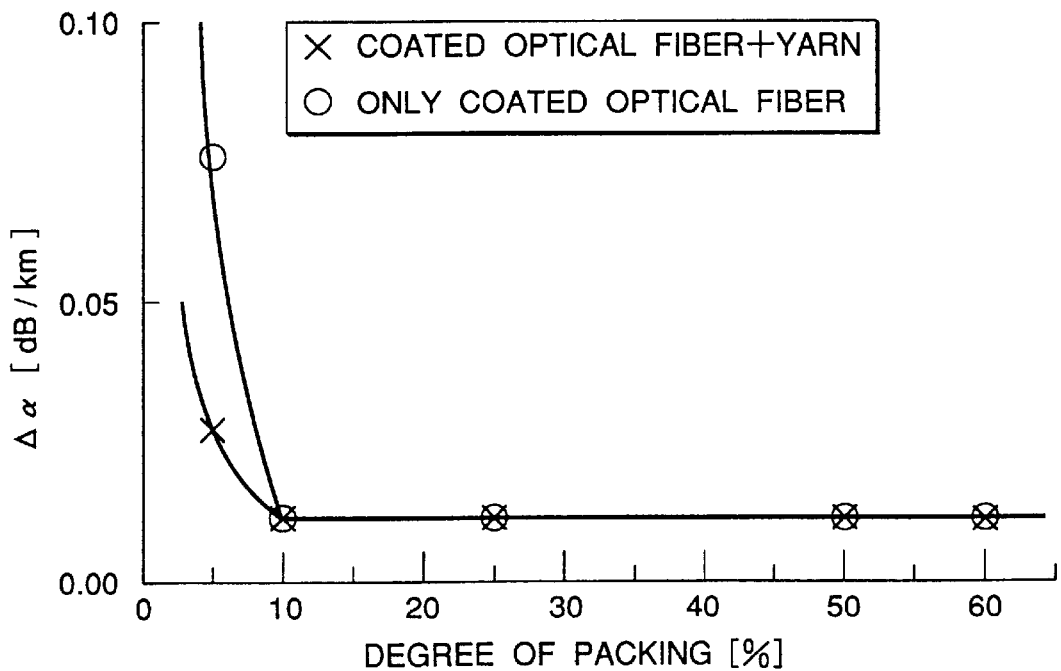
FIG. 4 is a presentation showing the results of a 50-m vertical installation/vibration test conducted on cable samples.

With respect to each of the examples of the two kinds of spacer type optical fiber cables shown in FIGS. 1 and 2, six kinds of optical fiber cable samples were regulated so as to have degrees of optical-fiber packing of 5%, 10%, 25%, 40%, 50%, and 60%, respectively, by changing the dimensions of the grooves in order to ascertain the effects of the present invention. The twelve optical fiber cable samples in total were subjected to a heat cycle test using a temperature range of from −40 to +60° C. and also to a 50-m vertical installation/vibration test. The results obtained are shown in FIGS. 3 and 4. In FIG. 3 are plotted the values obtained at −40° C., at which the transmission loss was maximum. In FIG. 4 are plotted the values of loss fluctuation obtained after the drawing of the coated optical fibers from the upper end had stopped, that is, after an area where an excess of coated optical fiber length was concentrated had been generated in a lower part.

FIG. 3 shows that degrees of packing not higher than 50% are effective in diminishing the loss increase at low temperatures. FIG. 4 shows that degrees of packing not lower than 10% are effective in eliminating the loss increase caused by the shift of an excess of the length of the coated optical fibers. It was further ascertained that even in the case of cables having a degree of packing of 5%, the cable in which the coated optical fibers have been bundled by coarse winding can have a loss increase smaller in some degree than that of the cable in which the coated optical fibers have not been bundled. The same effects could be ascertained in cable samples each containing coated optical fibers having an outer diameter of the covering of 500 $\mu$m and employing 550-denier cotton yarns.

Furthermore, influences of conditions for the coarse winding of cotton yarns on the effect of preventing loosening were also investigated. An coated optical fiber unit which had been bundled by coarse winding was taken out of a 1-m end part of a cable. The bundle was hung down vertically and vibrated for 3 minutes. Thereafter, the bundle was examined as to whether the cotton yarn(s) remained wound around the coated optical fibers. The results obtained are shown in FIG. 5. The state of coarse winding is expressed in three ratings of ○, Δ, and x. Symbol ○ indicates that the yarns satisfactorily retained the initial state; Δ indicates that the yarns were becoming loose but coated optical fibers of the same color could be distinguished from each other if the operation was conducted carefully; and x indicates that the yarns had got completely loose. FIG. 5 shows that the use of a pair of yarns wound in opposite directions has the effect of inhibiting the yarns from getting loose, and that this effect is enhanced by using a coarse-winding pitch of 400 mm or shorter. Use of yarns made of either a nylon or a carbon fiber was ascertained to have the same effect.

As apparent from the above description, according to the first aspect of the present invention, the air-core spacer type optical fiber cable comprising a spacer having continuous grooves extending in the lengthwise direction and coated optical fibers disposed in the grooves without using a filler for filling the grooves has been regulated so that in each of the grooves containing the coated optical fibers, the proportion of the total sectional area of the coated optical fibers to the sectional area of the space where an coated optical fiber can move is from 10 to 50%. Due to the above constitution, the coated optical fibers can be prevented from suffering a bending loss increase or breakage. In addition, an excess of length which has generated in the coated optical fibers can be absorbed and the excess of the length of the coated optical fibers can be inhibited from shifting in the lengthwise direction. Consequently, this cable is effective when used, for example, as a private optical fiber cable for vertical installation within a building, etc.

According to the second aspect of the present invention, since the coated optical fibers disposed in each groove consist of coated optical fiber units each consisting of two or more coated optical fibers around which one or more yarns or strings have been coarsely wound, the frictional resistance between the inner wall of each groove and the coated optical fibers is enhanced to thereby heighten the effect of inhibiting the coated optical fibers from shifting in the lengthwise direction.

According to the third and fourth aspect of the present invention, a plurality of yarns or strings have been coarsely wound around the coated optical fibers of each unit and at least two of the yearns or strings have been wound in opposite directions, or the pitch of coarse winding of the yearns or strings is 400 mm or shorter. Due to the above constitutions, the yarns or strings can be inhibited from getting loose.

According to the fifth aspect of the present invention, since the yarns or strings have been colored, coated optical fibers of the same color can be distinguished from each other. In addition, even when a larger number of coated optical fibers are to be disposed in each groove, the coated optical fibers can be easily handled.

According to the sixth and seventh aspect of the present invention, each coated optical fiber unit consists of two or more coated optical fibers which each has an outer diameter of the covering of from 230 to 290 $\mu$m and around which one or more yarns having a fineness of from 100 to 300 deniers have been coarsely wound, or each coated optical fiber unit consists of two or more coated optical fibers which each has an outer diameter of the covering of from 450 to 550 $\mu$m and around which one or more yarns having a fineness of from 400 to 700 deniers have been coarsely wound. Thus, bundles suitable for a particular outer covering diameter can be formed.

According to the eighth aspect of the present invention, the yarns or strings are made of cotton, a nylon, or a carbon fiber or of a combination of two or more thereof. Due to the use of such a soft material as the material of the yarns or strings, the stress imposed on the optical fiber can be minimized, although the clearance in each groove is reduced by the yarns or strings.

According to the ninth aspect of the present invention, since the grooves of the spacer extend in the form of S-Z twist, coated optical fibers can be easily taken out in an after-branching operation.

What is claimed is:

1. A spacer type optical fiber cable comprising:
   a spacer having continuous grooves extending in the lengthwise direction; and coated optical fibers disposed in the grooves without using a filler for filling the grooves, said coated optical fibers including a plurality of coated optical fibers disposed in each groove of said spacer; and an elongated flexible binding element for each plurality of coated optical fibers, said binding elements being wound about said plurality of coated optical fibers to bind the fibers in each of said plurality of fibers together;

wherein the proportion of the total sectional area of the coated optical fibers to the sectional area of the space of each of the grooves containing the coated optical fibers where a coated optical fiber can move is from 10 to 50%.

2. A spacer type optical fiber cable as claimed in claim 1, wherein a plurality of elongated flexible binding elements are coarsely wound around the coated optical fibers of each unit, at least a pair of the yearns or strings being wound in opposite directions.

3. A spacer type optical fiber cable as claimed in claim 1, wherein the pitch of coarse winding of the elongated flexible binding element strings is from 10 mm to 400 mm.

4. A spacer type optical fiber cable as claimed in claim 1, wherein the elongated flexible binding element has been colored.

5. A spacer type optical fiber cable as claimed in claim 1, wherein each plurality of said fibers has an outer diameter covering of from 230 to 290 $\mu$m around which one or more elongated flexible binding elements having a fineness of from 100 to 300 deniers are coarsely wound.

6. A spacer type optical fiber cable as claimed in claim 1, wherein each plurality of said coated optical fibers has an outer diameter of from 450 to 550 $\mu$m around which one or more said elongated flexible binding elements having a fineness of from 400 to 700 deniers is coarsely wound.

7. A spacer type optical fiber cable as claimed in claim 1, wherein the elongated flexible binding elements is made of cotton, a nylon, or a carbon fiber or of a combination of two or more thereof.

8. A spacer type optical fiber cable as claimed in claims 1, wherein the grooves of the spacer extend in the form of S-Z twist.

9. A spacer type optical fiber cable, comprising:

a spacer having continuous grooves extending in the lengthwise direction; and coated optical fibers disposed in the grooves without using a filler for filling the grooves, said coated optical fibers being single-optical fibers;

wherein the proportion of the total sectional area of the single-optical fibers to the sectional area of the space of each of the grooves containing the single-optical fibers is from 10 to 50%.

* * * * *